(12) United States Patent
Zhang et al.

(10) Patent No.: US 10,417,061 B2
(45) Date of Patent: Sep. 17, 2019

(54) OPERATING METHOD OF ROUTING DEVICE, ROUTING DEVICE, AND TERMINAL DEVICE

(71) Applicant: Huawei Technologies Co., Ltd., Shenzhen (CN)

(72) Inventors: Ke Zhang, Shenzhen (CN); Yueli Gao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 154 days.

(21) Appl. No.: 15/386,356

(22) Filed: Dec. 21, 2016

(65) Prior Publication Data

US 2017/0116048 A1   Apr. 27, 2017

Related U.S. Application Data

(63) Continuation of application No. PCT/CN2014/080507, filed on Jun. 23, 2014.

(51) Int. Cl.
   *G06F 9/54* (2006.01)
   *G06F 9/44* (2018.01)
   *H04L 12/931* (2013.01)

(52) U.S. Cl.
   CPC ............ *G06F 9/541* (2013.01); *G06F 9/44* (2013.01); *G06F 9/547* (2013.01); *H04L 49/20* (2013.01)

(58) Field of Classification Search
   None
   See application file for complete search history.

(56) References Cited

U.S. PATENT DOCUMENTS

| | | |
|---|---|---|
| 8,505,006 B1 | 8/2013 | Larkin et al. |
| 2005/0091669 A1 | 4/2005 | Lamb et al. |
| 2007/0260447 A1 | 11/2007 | Canton |
| 2008/0126520 A1 | 5/2008 | Werber et al. |

(Continued)

FOREIGN PATENT DOCUMENTS

| | | |
|---|---|---|
| CN | 1609791 A | 4/2005 |
| CN | 101344860 A | 1/2009 |

(Continued)

OTHER PUBLICATIONS

Machine Translation and Abstract of Chinese Publication No. CN102364435, Feb. 29, 2012, 8 pages.

(Continued)

*Primary Examiner* — S. Sough
*Assistant Examiner* — Phuong N Hoang
(74) *Attorney, Agent, or Firm* — Conley Rose, P.C.

(57) ABSTRACT

An operating method of a routing device, a routing device and a terminal device, where the routing device includes a first system and a second system, and the method includes acquiring, by the first system, a first application programming interface (API) call request, where the first API call request is sent by an application program running in the first system, converting, by the first system, the first API call request into a second API call request matching the second system, sending the second API call request to the second system, and executing, by the second system, the second API call request. Hence, difficulty of developing the application program on the routing device can be reduced.

18 Claims, 9 Drawing Sheets

(56) References Cited

U.S. PATENT DOCUMENTS

| | | | |
|---|---|---|---|
| 2009/0094317 A1* | 4/2009 | Venkitaraman | H04L 29/12311 709/203 |
| 2011/0304465 A1* | 12/2011 | Boult | B60K 28/06 340/576 |
| 2012/0084792 A1* | 4/2012 | Benedek | G06F 9/544 719/313 |
| 2012/0254364 A1* | 10/2012 | Vijayan | H04L 65/4084 709/219 |
| 2013/0016628 A1* | 1/2013 | Bertani | H04L 41/046 370/255 |
| 2015/0154059 A1 | 6/2015 | Teng et al. | |
| 2015/0339137 A1* | 11/2015 | Andrus | G06F 9/45516 717/148 |
| 2016/0077850 A1* | 3/2016 | Andrus | G06F 9/4552 717/139 |

FOREIGN PATENT DOCUMENTS

| | | |
|---|---|---|
| CN | 102364435 A | 2/2012 |
| CN | 102685210 A | 9/2012 |
| CN | 103177028 A | 6/2013 |
| CN | 103593370 A | 2/2014 |
| CN | 104380661 A | 2/2015 |
| EP | 0911732 A2 | 4/1999 |

OTHER PUBLICATIONS

Machine Translation and Abstract of Chinese Publication No. CN1003177028, Jun. 26, 2013, 14 pages.
Foreign Communication From a Counterpart Application, European Application No. 14895814.3, Extended European Search Report dated Jun. 8, 2017, 7 pages.
Foreign Communication From a Counterpart Application, PCT Application No. PCT/CN2014/080507, English Translation of International Search Report dated Mar. 23, 2015, 2 pages.
Foreign Communication From a Counterpart Application, PCT Application No. PCT/CN2014/080507, English Translation of Written Opinion dated Mar. 23, 2015, 7 pages.
Foreign Communication From a Counterpart Application, Chinese Application No. 201480001392.1, Chinese Notice of Allowance dated Jan. 3, 2019, 4 pages.

* cited by examiner

OPERATING METHOD OF ROUTING DEVICE, ROUTING DEVICE, AND TERMINAL DEVICE

CROSS-REFERENCE TO RELATED APPLICATIONS

This application is a continuation of International Patent Application No. PCT/CN2014/080507, filed on Jun. 23, 2014, which is hereby incorporated by reference in its entirety.

TECHNICAL FIELD

Embodiments of the present disclosure relate to communications technologies, and in particular, to an operating method of a routing device, a routing device, and a terminal device.

BACKGROUND

Compared with an ordinary router, an intelligent router, that is, a router with intelligent management, has an independent operating system as a personal computer does, and a user may install various application programs on the intelligent router. Using the installed application programs, control functions such as automatically controlling a bandwidth, automatically controlling a quantity of online users, automatically controlling a browsed web page, and automatically controlling an online time can be achieved, and intelligent management of the router can be implemented.

In a system architecture of a current intelligent router, an open wireless router (Open wrt) system is used as an operating system of the intelligent router. The Open wrt is a LINUX operating system with a writeable file system, and application programs may be developed and installed based on the operating system. However, the Open wrt system is not a router system specially issued by a router vendor, and a developer has relatively high difficulty in developing an application program on the system.

SUMMARY

A technical problem to be resolved in embodiments of the present disclosure is to provide an operating method of a routing device, a routing device, and a terminal device, which can resolve a defect that it is highly difficult to develop an application program in a router system.

To resolve the foregoing technical problem, a first aspect of the embodiments of the present disclosure provides an operating method of a routing device, including acquiring, by a first system, a first application programming interface (API) call request, where the first API call request is sent by an application program running in the first system, converting, by the first system, the first API call request into a second API call request matching a second system, and sending the second API call request to the second system, and executing, by the second system, the second API call request.

With reference to the first aspect, in a first possible implementation manner, after executing, by the second system, the second API call request, the method further includes returning, by the second system, a second API call response to the first system, and converting, by the first system, the second API call response into a first API call response matching the first system, and returning the first API call response to the application program.

With reference to the first aspect or the first possible implementation manner, in a second possible implementation manner, converting, by a first system, the first API call request into a second API call request matching a second system includes converting, by the first system according to a preset first mapping relationship, the first API call request into the second API call request matching the second system, or extracting, by the first system, a request parameter from the first API call request, and generating, according to the request parameter, the second API call request matching the second system.

With reference to the first possible implementation manner, in a third possible implementation manner, converting, by the first system, the second API call response into a first API call response matching the first system includes converting, by the first system according to a preset second mapping relationship, the second API call response into the first API call response matching the first system, or extracting, by the first system, a response parameter from the second API call response, and generating, according to the response parameter, the first API call response matching the first system.

With reference to any one of the first aspect to the third possible implementation manner, in a fourth possible implementation manner, the first API call request includes any one or more of an application authentication request, an Internet Protocol (IP) address configuration request, an IP address acquiring request, an IP routing protocol configuration request, a port configuration request, a tunnel status acquiring request, a tunnel configuration request, a domain name system (DNS) information acquiring request, and a DNS information configuration request.

With reference to any one of the first aspect to the fourth possible implementation manner, in a fifth possible implementation manner, an operating system running in the first system includes any one of ANDROID, an APPLE mobile device operating system (iOS), WINDOWS PHONE, and BLACKBERRY, and an operating system running in the second system includes LINUX or an embedded configurable operating system (eCOS).

A second aspect of the embodiment of the present disclosure provides an operating method of a routing device, including acquiring, by a terminal device, a first API call request, where the first API call request is sent by an application program running in a first system, and converting, by the terminal device, the first API call request into a second API call request matching a second system, and sending the second API call request to the routing device such that the routing device executes the second API call request.

With reference to the second aspect, in a first possible implementation manner, after converting, by the terminal device, the first API call request into a second API call request matching a second system, and sending the second API call request to the routing device such that the routing device executes the second API call request, the method further includes receiving, by the terminal device, a second API call response returned by the second system, and converting, by the terminal device, the second API call response into a first API call response matching the first system, and returning the first API call response to the application program.

With reference to the second aspect or the first possible implementation manner, in a second possible implementation manner, converting, by the terminal device, the first API call request into a second API call request matching a second system includes converting, by the terminal device according to a preset first mapping relationship, the first API call request into the second API call request matching the second system, or extracting, by the terminal device, a request parameter from the first API call request, and generating, according to the request parameter, the second API call request matching the second system.

With reference to the first possible implementation manner, in a third possible implementation manner, converting, by the terminal device, the second API call response into a first API call response matching the first system includes converting, by the terminal device according to a preset second mapping relationship, the second API call response into the first API call response matching the first system, or extracting, by the terminal device, a response parameter from the second API call response, and generating, according to the response parameter, the first API call response matching the first system.

With reference to any one of the second aspect to the third possible implementation manner, in a fourth possible implementation manner, the first API call request includes any one or more of an application authentication request, an IP address configuration request, an IP address acquiring request, an IP routing protocol configuration request, a port configuration request, a tunnel status acquiring request, a tunnel configuration request, a DNS information acquiring request, and a DNS information configuration request.

With reference to any one of the second aspect to the fourth possible implementation manner, in a fifth possible implementation manner, an operating system running in the first system includes any one of ANDROID, an iOS, WINDOWS PHONE, and BLACKBERRY, and an operating system running in the second system includes LINUX or an eCOS.

A third aspect of the embodiments of the present disclosure provides a routing device, where the routing device includes a first system and a second system, the first system includes a first request acquiring module and a first request conversion module, and the second system includes a request execution module, where the first request acquiring module is configured to acquire a first API call request, where the first API call request is sent by an application program running in the first system. The first request conversion module is configured to convert the first API call request into a second API call request matching the second system, and send the second API call request to the second system, and the request execution module is configured to execute the second API call request.

With reference to the third aspect, in a first possible implementation manner, the second system further includes a response returning module, and the first system further includes a first response conversion module, where the response returning module is configured to return a second API call response to the first system after the request execution module executes the second API call request, and the first response conversion module is configured to convert the second API call response into a first API call response matching the first system, and return the first API call response to the application program.

With reference to the third aspect or the first possible implementation manner, in a second possible implementation manner, when converting the first API call request into the second API call request matching the second system, the first request conversion module is further configured to convert, according to a preset first mapping relationship, the first API call request into the second API call request matching the second system, or extract a request parameter from the first API call request, and generate, according to the request parameter, the second API call request matching the second system.

With reference to the first possible implementation manner, in a third possible implementation manner, when converting the second API call response into the first API call response matching the first system, the first response conversion module is further configured to convert, according to a preset second mapping relationship, the second API call response into the first API call response matching the first system, or extract a response parameter from the second API call response, and generate, according to the response parameter, the first API call response matching the first system.

With reference to any one of the third aspect to the third possible implementation manner, in a fourth possible implementation manner, the first API call request includes any one or more of an application authentication request, an IP address configuration request, an IP address acquiring request, an IP routing protocol configuration request, a port configuration request, a tunnel status acquiring request, a tunnel status configuration request, a DNS information acquiring request, and a DNS information configuration request.

With reference to any one of the third aspect to the fourth possible implementation manner, in a fifth possible implementation manner, an operating system running in the first system includes any one of ANDROID, an iOS, WINDOWS PHONE, and BLACKBERRY, and an operating system running in the second system includes LINUX or an eCOS.

A fourth aspect of the embodiments of the present disclosure provides a terminal device, where the terminal device includes a first system, and the first system includes a second request acquiring module configured to acquire a first API call request, where the first API call request is sent by an application program running in the first system, and a second request conversion module configured to convert the first API call request into a second API call request that matches a second system included in a routing device, and send the second API call request to the routing device such that the routing device executes the second API call request.

With reference to the fourth aspect, in a first possible implementation manner, the first system further includes a response receiving module configured to receive a second API call response returned by the second system after the second request conversion module sends the second API call request to the routing device, and a second response conversion module configured to convert the second API call response into a first API call response matching the first system, and return the first API call response to the application program.

With reference to the fourth aspect or the first possible implementation manner, in a second possible implementation manner, when converting the first API call request into the second API call request that matches the second system included in the routing device, the second request conversion module is further configured to convert, according to a preset first mapping relationship, the first API call request into the second API call request matching the second system, or extract a request parameter from the first API call request, and generate, according to the request parameter, the second API call request matching the second system.

With reference to the first possible implementation manner, in a third possible implementation manner, when converting the second API call response into the first API call response matching the first system, the second response conversion module is further configured to convert, according to a preset second mapping relationship, the second API call response into the first API call response matching the first system, or extract a response parameter from the second API call response, and generate, according to the response parameter, the first API call response matching the first system.

With reference to any one of the fourth aspect to the third possible implementation manner, in a fourth possible implementation manner, the first API call request includes any one or more of an application authentication request, an IP address configuration request, an IP address acquiring request, an IP routing protocol configuration request, a port configuration request, a tunnel status acquiring request, a tunnel status configuration request, a DNS information acquiring request, and a DNS information configuration request.

With reference to any one of the fourth aspect to the fourth possible implementation manner, in a fifth possible implementation manner, an operating system running in the first system includes any one of ANDROID, an iOS, WINDOWS PHONE, and BLACKBERRY, and an operating system running in the second system includes LINUX or an eCOS.

A fifth aspect of the embodiments of the present disclosure provides a routing device, including a processor and a memory, where the memory stores a group of program code, and the processor is configured to call the program code stored in the memory to execute the operations of acquiring a first API call request, where the first API call request is sent by an application program running in a first system, converting the first API call request into a second API call request matching a second system, and sending the second API call request to the second system, and executing the second API call request, where the first system and the second system run in the routing device.

With reference to the fifth aspect, in a first possible implementation manner, after executing the second API call request, the processor is further configured to execute the operations of returning a second API call response to the first system, and converting the second API call response into a first API call response matching the first system, and returning the first API call response to the application program.

With reference to the fifth aspect or the first possible implementation manner, in a second possible implementation manner, executing, by the processor, the operation of converting the first API call request into a second API call request matching the second system includes converting, according to a preset first mapping relationship, the first API call request into the second API call request matching the second system, or extracting a request parameter from the first API call request, and generating, according to the request parameter, the second API call request matching the second system.

With reference to the first possible implementation manner, in a third possible implementation manner, executing, by the processor, the operation of converting the second API call response into a first API call response matching the first system includes converting, according to a preset second mapping relationship, the second API call response into the first API call response matching the first system, or extracting a response parameter from the second API call response, and generating, according to the response parameter, the first API call response matching the first system.

With reference to any one of the fifth aspect to the third possible implementation manner, in a fourth possible implementation manner, the first API call request includes any one or more of an application authentication request, an IP address configuration request, an IP address acquiring request, an IP routing protocol configuration request, a port configuration request, a tunnel status acquiring request, a tunnel configuration request, a DNS information acquiring request, and a DNS information configuration request.

With reference to any one of the fifth aspect to the fourth possible implementation manner, in a fifth possible implementation manner, an operating system running in the first system includes any one of ANDROID, an iOS, WINDOWS PHONE, and BLACKBERRY, and an operating system running in the second system includes LINUX or an eCOS.

A sixth aspect of the embodiments of the present disclosure provides a terminal device, including a processor and a memory, where the memory stores a group of program code, and the processor is configured to call the program code stored in the memory to execute the following operations of acquiring a first API call request, where the first API call request is sent by an application program running in a first system, and the first system runs in the terminal device, and converting the first API call request into a second API call request that matches a second system included in a routing device, and sending the second API call request to the routing device such that the routing device executes the second API call request.

With reference to the sixth aspect, in a first possible implementation manner, after sending the second API call request to the routing device, the processor is further configured to execute the operations of receiving a second API call response returned by the second system, and converting the second API call response into a first API call response matching the first system, and returning the first API call response to the application program.

With reference to the sixth aspect or the first possible implementation manner, in a second possible implementation manner, executing, by the processor, the operation of converting the first API call request into a second API call request matching the second system includes converting, according to a preset first mapping relationship, the first API call request into the second API call request matching the second system, or extracting a request parameter from the first API call request, and generating, according to the request parameter, the second API call request matching the second system.

With reference to the first possible implementation manner, in a third possible implementation manner, executing, by the processor, the operation of converting the second API call response into a first API call response matching the first system includes converting, according to a preset second mapping relationship, the second API call response into the first API call response matching the first system, or extracting a response parameter from the second API call response, and generating, according to the response parameter, the first API call response matching the first system.

With reference to any one of the sixth aspect to the third possible implementation manner, in a fourth possible implementation manner, the first API call request includes any one or more of an application authentication request, an IP address configuration request, an IP address acquiring request, an IP routing protocol configuration request, a port configuration request, a tunnel status acquiring request, a tunnel configuration request, a DNS information acquiring request, and a DNS information configuration request.

With reference to any one of the sixth aspect to the fourth possible implementation manner, in a fifth possible implementation manner, an operating system running in the first system includes any one of ANDROID, an iOS, WINDOWS PHONE, and BLACKBERRY, and an operating system running in the second system includes LINUX or an eCOS.

The embodiments of the present disclosure have the following beneficial effects.

An API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be understood that ordinal numbers such as "first" and "second" that are mentioned in the embodiments of the present disclosure are merely used for distinction, unless it is clearly inferred according to the context that they express a sequence.

Figure 1:
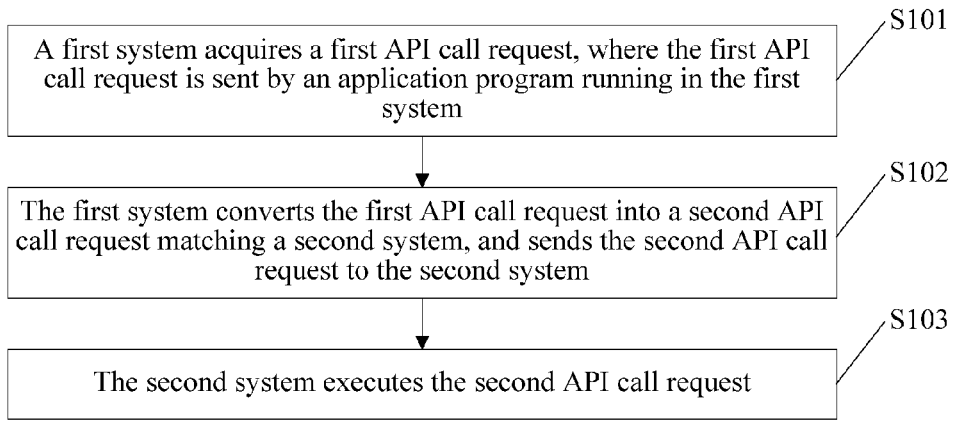
FIG. 1 is a schematic flowchart of an operating method of a routing device according to a first embodiment of the present disclosure.

Reference may be made to FIG. 1, which is a schematic flowchart of an operating method of a routing device according to a first embodiment of the present disclosure. In this embodiment, the method includes the following steps.

Step S101: A first system acquires a first API call request, where the first API call request is sent by an application program running in the first system.

Further, the routing device includes the first system and a second system, where the first system may include an operating system, and may further include some hardware resources for running the operating system, and the second system may include an operating system, and may further include some hardware resources for running the operating system. The first system and the second system may share hardware resources of the routing device. The operating system running in the first system and the operating system running in the second system are of different types, where the operating system running in the first system may be a universal operating system, and is applied in a wide range, and the operating system running in the second system is a special operating system for the routing device, and is applied in a small range. The application program runs in the first system. The application program sends a first API call request to the first system when the application program needs to call an API provided by the second system, where the first API call request is used to call a routing capability API provided by the second system. The first API call request may include multiple request parameters, for example, the request parameters may include an operation command, an API interface version number, an API type, an API call request format, and the like.

Step S102: The first system converts the first API call request into a second API call request matching a second system, and sends the second API call request to the second system.

Further, operating systems running in the first system and in the second system are of different types, and API call syntax rules in different operating systems may also be different. The first system included in the routing device converts the first API call request into a second API call request recognizable to the operating system running in the second system, and sends the second API call request to the operating system running in the second system.

For example, an ANDROID operating system runs in the first system, and a LINUX operating system runs in the second system. It can be known that a syntax rule of an API call request in the ANDROID operating system is different from that of an API call request in the LINUX operating system, and the first system needs to convert a first API call request that is sent by an application program running in the ANDROID operating system into a second API call request that matches the LINUX operating system running in the second system.

It can be understood that the first system identifies whether a parameter in the first API call request sent by the application program satisfies a requirement, and if it is satisfies the requirement, the first system converts the first API call request into the second API call request matching the second system, or if not, the first system returns error prompt information to the application program, where the error prompt information is used to indicate that the parameter in the first API call request is erroneous.

For example, an interface version number included in the first API call request is v2, and an interface version number supported by the first system is v3. The first system identifies that the interface version number in the first API call request does not satisfy a requirement, and therefore, the first system returns, to the application program, error prompt information indicating that the interface version number is erroneous.

For example, a format of the first API call request is HyperText Transfer Protocol (HTTP) 1.0, and a format supported by the first system is HTTP 1.1. The first system identifies that the format of the first API call request does not satisfy a requirement, and therefore, the first system returns, to the application program, error prompt information indicating that the format is erroneous.

Step S103: The second system executes the second API call request.

Further, the second system receives the second API call request matching the second system, executes the second API call request, generates a corresponding second API call response according to the second API call request, and sends the second API call response to the routing device.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 2:
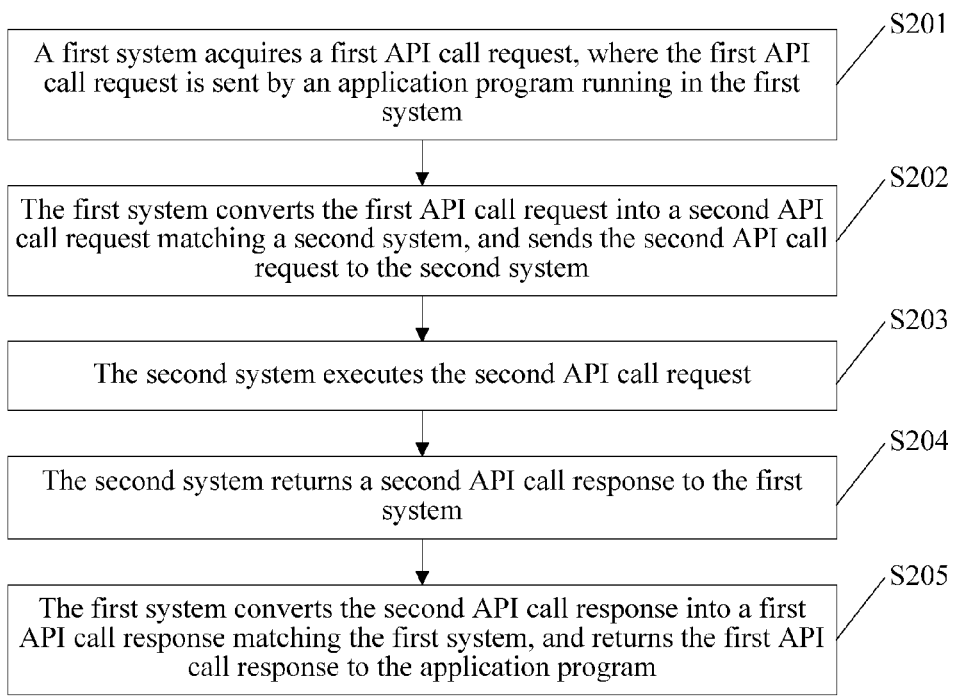
FIG. 2 is a schematic flowchart of an operating method of a routing device according to a second embodiment of the present disclosure.

Reference may be made to FIG. 2, which is a schematic flowchart of an operating method of a routing device according to a second embodiment of the present disclosure. In this embodiment of the present disclosure, the method includes the following steps.

Step S201: A first system acquires a first API call request, where the first API call request is sent by an application program running in the first system.

Further, the routing device may include the first system and a second system. An operating system running in the first system is a universal operating system, and is applied in a wide range, and an operating system running in the second system is a special operating system for the routing device, and is applied in a small range. Optionally, the operating system running in the first system may include any one of ANDROID, an iOS, WINDOWS PHONE, and BLACKBERRY, and the operating system running in the second system may include LINUX or an eCOS.

It should be noted that, in the embodiments of the present disclosure, operating systems running in the first system and the second system are not limited to the foregoing content, for example, the operating system running in the second system may also be ANDROID, an iOS, or the like, as long as it is ensured that the operating systems running in the first system and the second system are different.

The application program runs in the first system. The application program sends a first API call request to the first system when the application program needs to call an API provided by the second system, where the first API call request is used to call a routing capability API provided by the second system. The first API call request may include multiple request parameters. Optionally, the request parameters include an operation command, an API interface version number, an API type, an API call request format, and the like.

Exemplarily, the first system acquires the first API call request sent by the application program, where a syntax rule of the first API call request satisfies a provision of the Representational State Transfer (REST). For example, the first API call request includes POST/v1/api/category/model HTTP1.1, and meanings of the request parameters in the first API call request are as follows.

Parameter POST represents an operation command. For example, POST is a change command, and GET is a query command.

Parameter v1 represents an API interface version number supported by the application program. For example, if the application program supports only an interface v1, an interface v2 cannot be called.

Parameter API represents a node name, and all API resources are included in this API node.

Parameter category represents an API type, for example, a type such as a tunnel API or DNS API of the routing device.

Parameter model represents a sub-type of category, for example, an Layer 2 Tunneling Protocol (L2TP) tunnel API of the tunnel API.

Parameter HTTP 1.1 represents a format of the first API call request.

Optionally, in this embodiment of the present disclosure, the first API call request includes any one or more of an application authentication request, a tunnel status acquiring request, a tunnel status configuration request, a DNS information acquiring request, and a DNS configuration request. Exemplarily, a form of the first API call request sent by the application program is as follows.

1. Application authentication request: POST /v1/api/oauth2/token HTTP/1.1

| Field name | Type | Length | Description | M/O |
|---|---|---|---|---|
| AppId | string | 64 | Unique ID of an App, where AppId needs to be applied for | M |
| AppSecret | string | 64 | Password corresponding to the App, where AppSecret needs to be applied for | M |

2. Point-to-Point tunneling protocol (PPTP) tunnel status acquiring request: GET /v1/api/tunnel/PPTP HTTP/1.1

3. PPTP tunnel configuration request: POST /v1/api/tunnel/PPTP HTTP/1.1

4. L2TP tunnel status acquiring request: GET /v1/api/tunnel/L2TP HTTP/1.1

5. L2TP tunnel configuration request: POST /v1/api/tunnel/L2TP HTTP/1.1

6. DNS information acquiring request: GET /v1/api/DNS/server HTTP/1.1

7. DNS information configuration request: POST /v1/api/DNS/server HTTP/1.1

8. DNS filtering information acquiring request: GET /v1/api/DNS/filter HTTP/1.1

9. DNS filtering information configuration request: POST /v1/api/DNS/filter HTTP/1.1

| Field name | Type | Length | Description | M/O |
|---|---|---|---|---|
| DomainName | string | 32 | DNS domain name to be filtered | M |
| Operation | string | 32 | Operation:<br>add: Add<br>delete: Delete | M |

The foregoing are some examples of the first API call request. During specific implementation, the first API call request further includes any one of an IP address configuration request, an IP address acquiring request, an IP routing protocol configuration request, and a port configuration request. A first API call request satisfying the REST protocol may be customized as required.

It can be understood that before the first system acquires the first API call request, a communication connection is already established between the first system and the second system. For example, the first system may detect the second system using the Universal Plug and Play (UPnP) protocol. After the second system is detected, bidirectional identity authentication may be performed. After the first system and the second system pass the bidirectional identity authentication, the communication connection is established between the first system and the second system, where the communication connection established between the first system and the second system may be a Transmission Control Protocol (TCP) connection, or may be a communication connection of another type, which is not limited in the present disclosure.

Step S202: The first system converts the first API call request into a second API call request matching a second system, and sends the second API call request to the second system.

Further, the operating systems running in the first system and in the second system are of different types, and API call syntax rules in different operating systems may also be different. The first system included in the routing device converts the first API call request into a second API call request recognizable to the operating system running in the second system, and sends the second API call request to the operating system in the second system.

For example, the operating system running in the first system is an ANDROID operating system, and the operating system running in the second system is a LINUX operating system. It can be known that a syntax rule of an API call request in the ANDROID operating system is different from that of an API call request in the LINUX operating system, and the first system needs to convert a first API call request that is sent by an application program running in the ANDROID operating system into a second API call request that matches the LINUX operating system running in the second system. Exemplarily, the application program sends the first API call request, where the first API call request is an application authentication request, and a form of the application authentication request includes the following form.

```
POST /v1/api/oauth2/token HTTP/1.1
{
  "AppId":"tunnel",
  "AppSecret":"ZjBiZDI3MGU5Mzk3MWNkMWMzNWM5N2QyM
zE2ZGY1YmM1MzhkYjQyZWI5ZDllYTkzMTA5NjNmOTQ5YzE1
MTBhMw=="
}
```

A syntax rule of the foregoing application authentication request (that is, the first API call request) satisfies the ANDROID operating system running in the first system, and the first system converts the application authentication request into an application authentication request that matches the LINUX operating system running in the second system, that is, the second API call request, which is expressed as follows.

```
CmdType:oauth2
CmdCode:1
Parameter:id=tunnel,sec=
ZjBiZDI3MGU5Mzk3MWNkMWMzNWM5N2QyMzE2ZGY1YmM
1MzhkYjQyZWI5ZDllYTkzMTA5NjNmOTQ5YzE1MTBhMw==
```

The foregoing description is provided using an example in which the first API call request sent by the application program is an application authentication request. For a method for sending an API request of another form by the application program, reference may be made to the example of the application authentication request, and details are not described again in the present disclosure.

In this embodiment of the present disclosure, a method for converting, by the first system, the first API call request into a second API call request matching the second system may include querying, by the first system included in the routing device according to a preset first mapping relationship, for the second API call request associated with the first API call request, where a correspondence between the first API call request matching the first system and the second API call request matching the second system is set in the first mapping relationship. After acquiring the first API call request, the first system included in the routing device can obtain the second API call request by querying the first mapping relationship.

Optionally, a method for converting, by the first system, the first API call request into a second API call request matching the second system may also include extracting, by the first system included in the routing device, a request parameter from the first API call request, and generating, according to the request parameter, the second API call request matching the second system.

It can be understood that the first system identifies whether the parameter in the first API call request sent by the application program satisfies a requirement, and if it satisfies the requirement, the first system converts the first API call request into the second API call request matching the second system, or if not, the first system returns error prompt information to the application program, where the error prompt information is used to indicate that the parameter in the first API call request is erroneous.

For example, an interface version number included in the first API call request is v2, and an interface version number supported by the first system is v3. The first system identifies that the interface version number in the first API call request does not satisfy a requirement, and therefore, the first system returns, to the application program, error prompt information indicating that the interface version number is erroneous.

For example, a format included in the first API call request is HTTP 1.0, and a format supported by the first system is HTTP 1.1. The first system identifies that the format in the first API call request does not satisfy a requirement, and therefore, the first system returns, to the application program, error prompt information indicating that the format is erroneous.

Step S203: The second system executes the second API call request.

Further, the second system receives the second API call request matching the second system, and executes an operation indicated by the second API call request. The second system generates a corresponding second API call response according to the second API call request, and sends the second API call response to the first system included in the routing device.

Step S204: The second system returns a second API call response to the first system.

Step S205: The first system converts the second API call response into a first API call response matching the first system, and returns the first API call response to the application program.

Further, the operating systems running in the first system and in the second system are of different types, and API call syntax rules in different operating systems may also be different. The first system included in the routing device converts the second API call response returned by the second system into a recognizable first API call response matching the first system, and sends the first API call response to the application program in the first system.

For example, the operating system running in the first system is an ANDROID operating system, and the operating system running in the second system is a LINUX operating system. The second API call response that is returned by the second system to the first system is an application authentication response, which is expressed as follows.

---
ErrorCode:0
Parameter:token=
M8ERGDUs1u1pJiojh0XufZd82a8Jh3n19ZTPCNfDgf1XxpgOqbiD
btLbDRUSTfS2cLQOw5qKkrIROWDe8VPhoys0qkSjxKjJt9vYdV
Ixkon9l0lrUbGgJ6g9q7qVPIEh

---

The first system converts the application authentication response received from the second system into an application authentication response matching the first system, which is expressed as follows.

---
HTTP/1.1 200 OK
{"AccessToken":"M8ERGDUs1u1pJiojh0XufZd82a8Jh3n19ZTPCN
fDgf1XxpgOqbiDbtLbDRUSTfS2cLQOw5qKkrIROWDe8VPhoys0qkS
jxKjJt9vYdVIxkon9l0lrUbGgJ6g9q7qVPIEh","RefreshToken":"",
"TokenType":"oauth"}

---

The routing device sends the first API call response to the application program, and the application program presents the first API call response.

In this embodiment of the present disclosure, a method for converting, by the first system, the second API call response into a first API call response matching the first system may include querying, by the first system included in the routing device according to a preset second mapping relationship, for the first API call response associated with the second API call response, where a correspondence between the first API call response matching the first system and the second API call response matching the second system is set in the second mapping relationship. After acquiring the second API call response returned by the second system, the first system included in the routing device can obtain the first API call response by querying the second mapping relationship.

Optionally, a method for converting, by the first system, the second API call response into a first API call response matching the first system may also include extracting, by the first system included in the routing device, a request parameter from the second API call response, and generating, according to the request parameter, the first API call response matching the first system.

It can be understood that, when sending the second API call request to the second system, the first system determines, within preset duration, whether the second API call response that is returned by the second system according to the second API call request is received, and if not, sends timeout prompt information to the application program.

For example, the preset duration is set to 50 milliseconds (ms). When the first system sends the generated second API call request to the second system, a timer is started, and if the second API call response is not received within 50 ms, the timeout prompt information is sent to the application program, where a form of the timeout prompt information may be error information code, for example, the timeout prompt information is "Error 404." The specific form may be set as required, and is not limited in the present disclosure. A user of the application program may find a cause of the error according to the timeout prompt information.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 3:
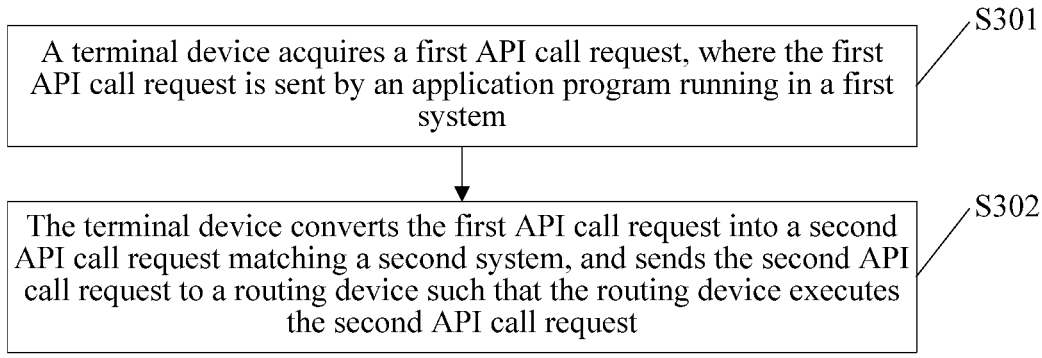
FIG. 3 is a schematic flowchart of an operating method of a routing device according to a third embodiment of the present disclosure.

Reference may be made to FIG. 3, which is a schematic flowchart of an operating method of a routing device according to a third embodiment of the present disclosure. In this embodiment of the present disclosure, the method includes the following steps.

Step S301: A terminal device acquires a first API call request, where the first API call request is sent by an application program running in a first system.

Further, the terminal device includes the first system, and the routing device includes a second system. The first system may include an operating system, and may further include some hardware resources for running the operating system, and the second system may include an operating system, and may further include some hardware resources for running the operating system. Hardware resources of the terminal device and the routing device are independent of each other. The operating system running in the terminal device and the operating system running in the routing device are of different types, where the operating system running in the terminal device may be a universal operating system, and is applied in a wide range, and the operating system running in the routing device is a special operating system, and is applied in a small range. The application program runs in the first system of the terminal device. The application program sends a first API call request to the first system of the terminal device when the application program needs to call an API provided by the second system of the routing device, where the first API call request is used to call a routing capability API provided by the second system of the routing device. The first API call request may include multiple request parameters, for example, the request parameters include an operation command, an API interface version number, an API type, an API call request format, and the like.

Step S302: The terminal device converts the first API call request into a second API call request matching a second system, and sends the second API call request to the routing device such that the routing device executes the second API call request.

Further, the operating systems running in the first system of the terminal device and in the second system of the routing device are of different types, and API call syntax rules in different operating systems are also different. The first system included in the terminal device converts the first API call request into a second API call request recognizable to the operating system that runs in the second system included in the routing device, and sends the second API call request to the operating system that runs in the second system included in the routing device. After receiving the second API call request, the routing device executes an operation indicated by the second API call request, and generates a corresponding second API call response.

For example, an ANDROID operating system runs in the first system included in the terminal device, and a LINUX operating system runs in the second system included in the routing device. It can be known that a syntax rule of an API call request in the ANDROID operating system is different from that of an API call request in the LINUX operating system, and the first system included in the terminal device needs to convert a first API call request that is sent by an application program running in the ANDROID operating system into a second API call request matching the LINUX operating system that runs in the second system included in the routing device.

It can be understood that the terminal device identifies whether a parameter in the first API call request sent by the application program satisfies a requirement, and if it is satisfies the requirement, the terminal device converts the first API call request into the second API call request that matches the second system included in the routing device, or if not, the terminal device returns error prompt information to the application program, where the error prompt information is used to indicate that the parameter in the first API call request is erroneous.

For example, an interface version number included in the first API call request is v2, and an interface version number that is supported by the first system included in the terminal device is v3. The terminal device identifies that the interface version number in the first API call request does not satisfy a requirement, and therefore, the terminal device returns, to the application program, error prompt information indicating that the interface version number is erroneous.

For example, a format included in the first API call request is HTTP 1.0, and a format supported by the first system is HTTP 1.1. The terminal device identifies that the format in the first API call request does not satisfy a requirement, and therefore, the terminal device returns, to the application program running in the first system, error prompt information indicating that the format is erroneous.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 4:
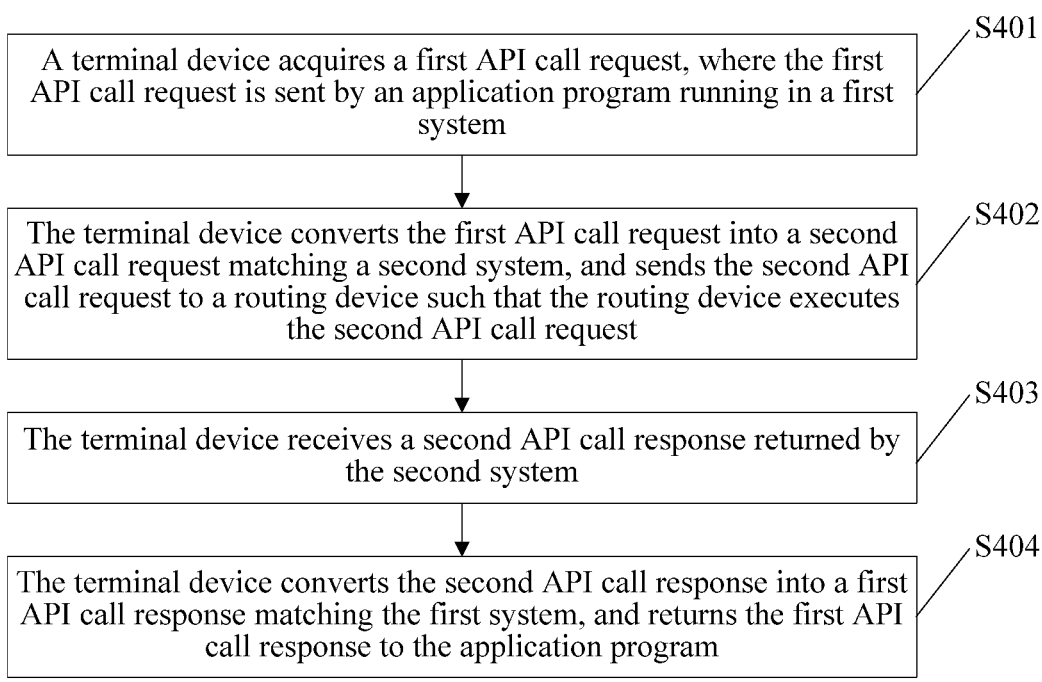
FIG. 4 is a schematic flowchart of an operating method of a routing device according to a fourth embodiment of the present disclosure.

Reference may be made to FIG. 4, which is a schematic flowchart of an operating method of a routing device according to a fourth embodiment of the present disclosure. In this embodiment, the method includes the following steps.

Step S401: A terminal device acquires a first API call request, where the first API call request is sent by an application program running in a first system.

Further, the terminal device includes the first system, and the routing device includes a second system. Hardware resources of the terminal device and the routing device are independent of each other. An operating system running in the terminal device and an operating system running in the routing device are of different types, where the operating system running in the terminal device may be a universal operating system, and is applied in a wide range, and the operating system running in the routing device is a special operating system, and is applied in a small range. Optionally, the operating system that runs in the first system included in the terminal device includes any one of ANDROID, an iOS, WINDOWS PHONE, and BLACKBERRY, and the operating system that runs in the second system included in the routing device includes LINUX or an eCOS. In this embodiment of the present disclosure, the terminal device may be a terminal such as a desktop computer, a notebook computer, a tablet computer, a smartphone, an intelligent game console, an intelligent audio and video entertainment device, or a personal digital assistant, which is not limited in the present disclosure.

The application program runs in the first system included in the terminal device. The application program sends a first API call request to the first system included in the terminal device when the application program needs to call an API provided by the second system included in the routing device, where the first API call request is used to call a routing capability API that is provided by the second system included in the routing device. The first API call request may include multiple request parameters. Optionally, the request parameters include an operation command, an API interface version number, an API type, an API call request format, and the like.

It can be understood that before the terminal device acquires the first API call request, a communication connection is already established between the terminal device and the routing device. For example, the terminal device may detect, according to a beacon signal broadcasted by the routing device, that the routing device exists. After the terminal device detects the routing device, bidirectional identity authentication may be performed. After the terminal device and the routing device pass the bidirectional identity authentication, the communication connection is established between the terminal device and the routing device, where the communication connection established between the terminal device and the routing device may be a TCP connection, or may be a communication connection of another type, which is not limited in the present disclosure.

Step S402: The terminal device converts the first API call request into a second API call request matching a second system, and sends the second API call request to the routing device such that the routing device executes the second API call request.

Further, operating systems that run in the first system included in the terminal device and in the second system included in the routing device are of different types, and API call syntax rules in different operating systems may also be different. The terminal device converts the first API call request into a second API call request recognizable to the operating system that runs in the second system included in the routing device, and sends the second API call request to the operating system in the second system. The routing device receives the second API call request that matches the routing device, and executes an operation indicated by the second API call request. The routing device generates a corresponding second API call response according to the second API call request, and sends the second API call response to the first system included in the terminal device.

For example, the operating system that runs in the first system included in the terminal device is an ANDROID operating system, and the operating system that runs in the second system included in the routing device is a LINUX operating system. It can be known that a syntax rule of an API call request in the ANDROID operating system is different from that of an API call request in the LINUX operating system, and the terminal device needs to convert a first API call request that is sent by an application program running in the ANDROID operating system into a second API call request matching the LINUX operating system that runs in the second system included in the routing device. Exemplarily, the application program sends the first API call request, where the first API call request is an application authentication request, and the second API call request is an application authentication request matching the LINUX operating system. For a specific form of the application authentication request, reference may be made to a description in step S202 of the embodiment shown in FIG. 2, and details are not described herein again. For a method for sending an API request of another form by the application program, reference may be made to the example of the application authentication request, and details are not described again in the present disclosure.

In this embodiment of the present disclosure, a method for converting, by the terminal device, the first API call request into a second API call request matching the second system may include querying, by the terminal device according to a preset first mapping relationship, for the second API call request associated with the first API call request, where a correspondence between the first API call request matching the first system and the second API call request matching the second system is set in the first mapping relationship. After acquiring the first API call request, the terminal device can obtain the second API call request by querying the first mapping relationship.

Optionally, a method for converting, by the terminal device, the first API call request into a first API call request matching the second system may also include extracting, by the terminal device, a request parameter from the first API call request, and generating, according to the request parameter, the second API call request matching the second system.

It can be understood that the terminal device identifies whether the parameter in the first API call request sent by the application program satisfies a requirement, and if it is satisfies the requirement, the terminal device converts the first API call request into the second API call request matching the second system, or if not, the first system returns error prompt information to the application program, where the error prompt information is used to indicate that the parameter in the first API call request is erroneous.

Step S403: The terminal device receives a second API call response returned by the second system.

Step S404: The terminal device converts the second API call response into a first API call response matching the first system, and returns the first API call response to the application program.

Further, the operating systems that run in the first system included in the terminal device and in the second system included in the routing device are of different types, and API call syntax rules in different operating systems may also be different. The terminal device converts the second API call response returned by the second system into a recognizable first API call response matching the terminal device, and sends the first API call response to the application program in the first system.

For example, the operating system that runs in the first system included in the terminal device is an ANDROID operating system, and the operating system that runs in the second system included in the routing device is a LINUX operating system. The second API call response that is returned by the routing device to the first system is an application authentication response, which is expressed as follows.

ErrorCode:0
Parameter:token=
M8ERGDUs1u1pJiojh0XufZd82a8Jh3n19ZTPCNfDgf1XxpgOqbiD
btLbDRUSTfS2cLQOw5qKkrIROWDe8VPhoys0qkSjxKjJt9vYdVI
xkon9l0lrUbGgJ6g9q7qVPIEh The terminal device converts the application authentication response received from the second system into an application authentication response matching the terminal device, which is expressed as follows.

HTTP/1.1 200 OK
{"AccessToken":"M8ERGDUs1u1pJiojh0XufZd82a8Jh3n19ZTPC
NfDgf1XxpgOqbiDbtLbDRUSTfS2cLQOw5qKkrIROWDe8VPhoys0
qkSjxKjJt9vYdVIxkon9l0lrUbGgJ6g9q7qVPIEh","RefreshToken":
"","TokenType":"oauth"}

The terminal device sends, to the application program, the first API call response obtained after conversion, and the application program presents the first API call response.

In this embodiment of the present disclosure, a method for converting, by the terminal device, the second API call response into a first API call response matching the terminal device may include querying, by the terminal device according to a preset second mapping relationship, for the first API call response associated with the second API call response, where a correspondence between the first API call response matching the first system and the second API call response matching the second system is set in the second mapping relationship. After acquiring the second API call response returned by the second system, the terminal device can obtain the first API call response by querying the second mapping relationship.

Optionally, a method for converting, by the terminal device, the second API call response into a first API call response matching the terminal device may also include extracting, by the terminal device, a response parameter from the second API call response, and generating, according to the response parameter, the first API call response matching the first system.

It can be understood that, when sending the second API call request to the second system, the terminal device determines, within preset duration, whether the second call response that is returned by the second system according to the second API call request is received, and if not, sends timeout prompt information to the application program.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 5:
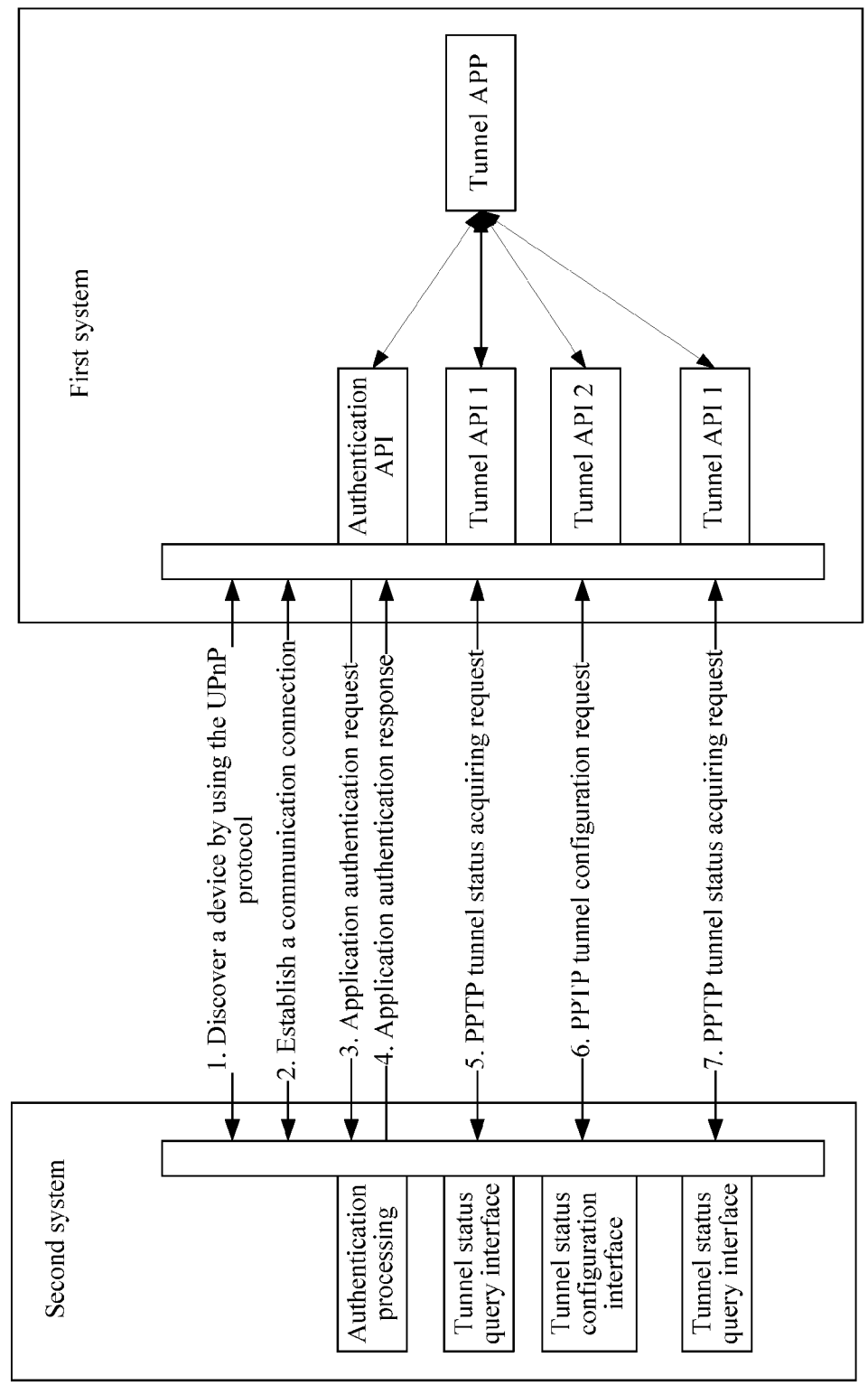
FIG. 5 is a schematic flowchart of an API call method for an application program according to a first embodiment of the present disclosure.
Figure 6:
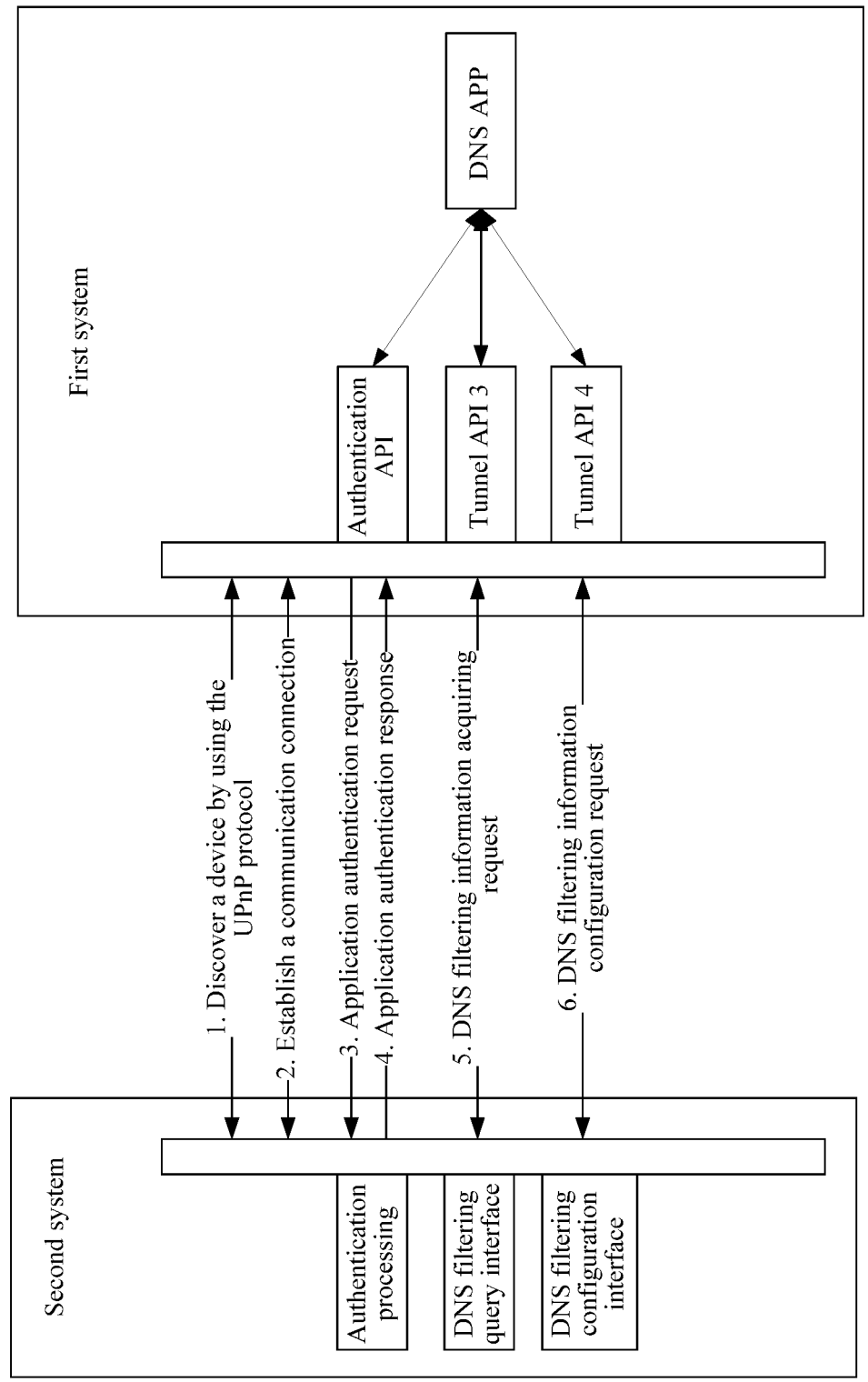
FIG. 6 is a schematic flowchart of an API call method for an application program according to a second embodiment of the present disclosure.

Reference may be made to FIG. 5 and FIG. 6, which are schematic flowcharts of an API call method for an application program according to embodiments of the present disclosure. The embodiments of the present disclosure are applicable to two scenarios, where a first scenario includes a routing device which includes a first system and a second system, where the first system and the second system share hardware resources of the routing device, and an operating system running in the first system and an operating system running in the second system are of different types, and a second scenario includes a terminal device which includes a first system, and a routing device includes a second system, where hardware resources of the terminal device and the routing device are independent of each other, and an operating system running in the terminal device and an operating system running in the routing device are of different types. An application program is a tunnel application program Tunnel APP, and the Tunnel APP calls an API 1 and an API 2 of the first system to implement a PPTP tunnel establishment function. A specific procedure is as follows.

1. Discover a device by using the UPnP protocol. The first system discovers the second system using the UPnP protocol.

2. Establish a communication connection. A communication connection, for example, a TCP connection, is established between the first system and the second system.

3. The first system sends an application authentication request to the second system.

Further, the Tunnel APP calls an authentication API in the first system to send an API call request to the first system. The first system converts the API call request into an application authentication request matching the second system. The second system executes authentication processing after receiving the application authentication request.

4. The second system returns an application authentication response to the first system, and the first system converts the application authentication response into an API call response matching the first system.

5. The first system sends a PPTP tunnel status acquiring request to the second system. The Tunnel APP calls the tunnel API 1 of the first system to send an API call request to the first system, and the first system converts the API call request into a PPTP tunnel status acquiring request matching the second system. The second system acquires PPTP tunnel status information of the routing device according to the PPTP tunnel status acquiring request, generates a response result carrying the PPTP tunnel status information, and returns the response result to the first system. The first system converts the response into a response result matching the first system, and sends the response result to the Tunnel APP for presentation.

6. The first system sends a PPTP tunnel configuration request to the second system, and the Tunnel APP calls the tunnel API 2 of the first system to configure a PPTP tunnel of the routing device, where the process is the same as that of step 5.

7. The first system sends a PPTP tunnel status acquiring request to the second system, and the Tunnel APP calls the tunnel API 1 of the first system again, to check whether the PPTP tunnel of the routing device is successfully configured.

Reference may be made to FIG. 6. In this embodiment of the present disclosure, the application program is a DNS APP, and the DNS APP calls an API 3 and an API 4 of the first system to implement a DNS filtering function. A specific procedure is as follows.

1. Discover a device by using the UPnP protocol.

2. Establish a communication connection between the first system and the second system.

3. Application authentication request.

4. Application authentication response.

5. DNS filtering information acquiring request, where the DNS APP calls the tunnel API 3 of the first system to send an API call request to the first system. The first system converts the API call request into a DNS filtering information acquiring request matching the second system. The second system acquires DNS filtering information of the routing device according to the DNS filtering information acquiring request, generates a response result carrying PPTP tunnel filtering information, and returns the response result to the first system. The first system converts the response into a response result matching the first system, and sends the response result to the DNS APP for presentation.

6. DNS filtering information configuration request, where the first system calls the tunnel API 4 to configure DNS filtering information of the routing device, where the process is the same as that of step 5.

Figure 7:
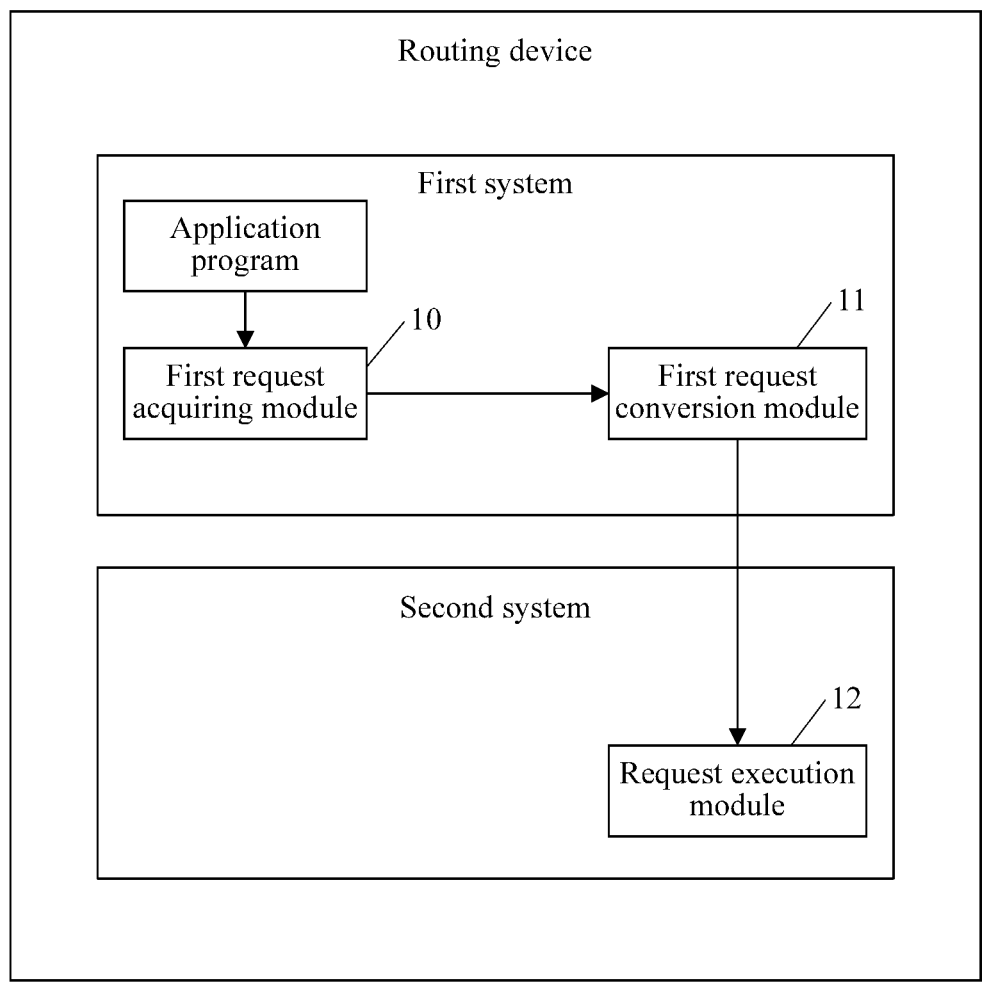
FIG. 7 is a schematic structural diagram of a routing device according to a first embodiment of the present disclosure.

Reference may be made to FIG. 7, which is a schematic structural diagram of a routing device according to an embodiment of the present disclosure. In this embodiment of the present disclosure, the routing device includes a first system and a second system, where the first system includes a first request acquiring module 10 and a first request conversion module 11, and the second system includes a request execution module 12.

The first request acquiring module 10 is configured to acquire a first API call request, where the first API call request is sent by an application program running in the first system.

Further, the routing device includes the first system and the second system. The application program runs in the first system. The application program sends a first API call request to the first request acquiring module 10 when the application program needs to call an API provided by the second system, where the first API call request is used to call a routing capability API provided by the second system. The first API call request may include multiple request parameters, for example, the request parameters include an operation command, an API interface version number, an API type, an API call request format, and the like.

The first request conversion module 11 is configured to convert the first API call request into a second API call request matching the second system, and send the second API call request to the second system.

Further, the operating systems running in the first system and in the second system are of different types, and API call syntax rules in different operating systems may also be different. The first request conversion module 11 converts the first API call request into a second API call request recognizable to the operating system running in the second system, and sends the second API call request to the operating system running in the second system.

The request execution module 12 is configured to execute the second API call request.

Further, the request execution module 12 receives the second API call request matching the second system, executes the second API call request, generates a corresponding second API call response according to the second API call request, and sends the second API call response to the first system.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 8:
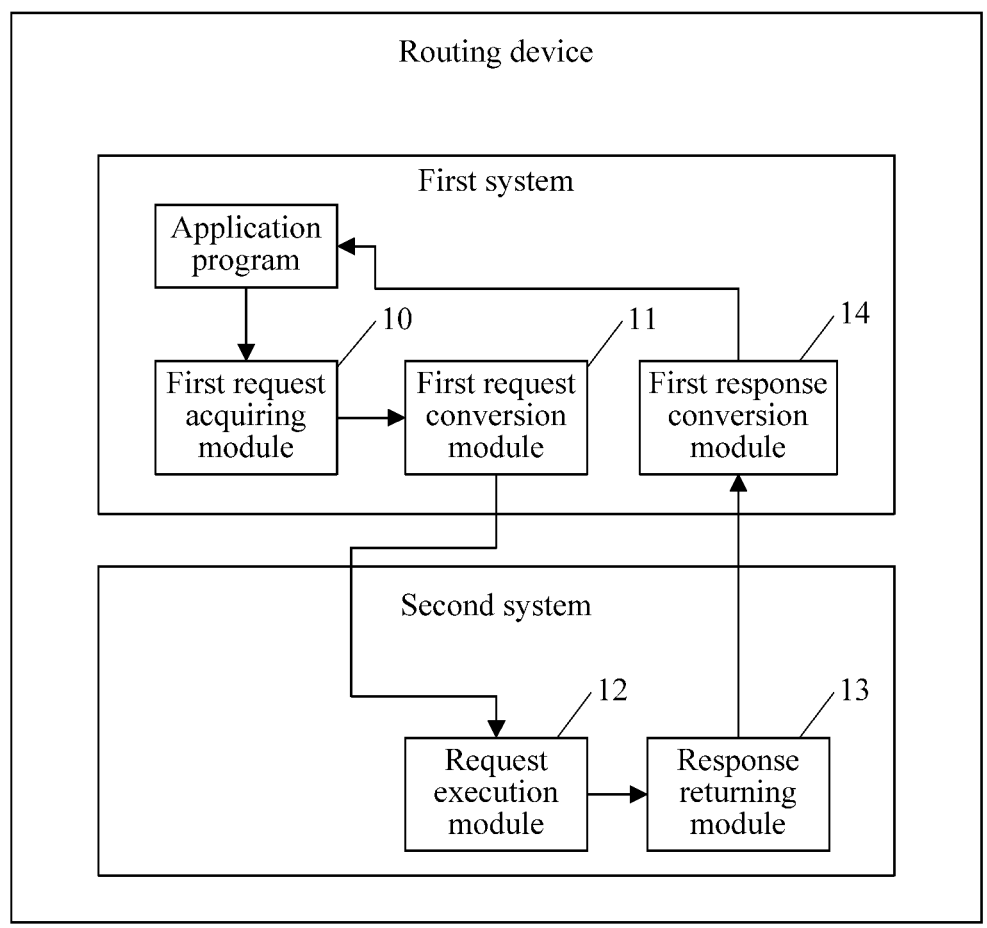
FIG. 8 is a schematic structural diagram of a routing device according to a second embodiment of the present disclosure.

Reference may be made to FIG. 8, which is a schematic structural diagram of a routing device according to a second embodiment of the present disclosure. In this embodiment of the present disclosure, the routing device includes a first system and a second system, where the first system not only includes a first request acquiring module 10 and a first request conversion module 11, but also includes a first response conversion module 14, and the second system not only includes a request execution module 12, but also includes a response returning module 13.

The response returning module 13 is configured to return a second API call response to the first system after the request execution module 12 executes the second API call request.

The first response conversion module 14 is configured to convert the second API call response into a first API call response matching the first system, and return the first API call response to the application program.

Optionally, when converting the first API call request into the second API call request matching the second system, the first request conversion module 11 is further configured to convert, according to a preset first mapping relationship, the first API call request into the second API call request matching the second system, or extract a request parameter from the first API call request, and generate, according to the request parameter, the second API call request matching the second system.

Optionally, when converting the second API call response into the first API call response matching the first system, the first response conversion module 14 is further configured to convert, according to a preset second mapping relationship, the second API call response into the first API call response matching the first system, or extract a response parameter from the second API call response, and generate, according to the response parameter, the first API call response matching the first system.

Optionally, the first API call request includes any one or more of an application authentication request, a tunnel status acquiring request, a tunnel status configuration request, a DNS information acquiring request, and a DNS information configuration request.

Optionally, an operating system running in the first system includes any one of ANDROID, an iOS, WINDOWS PHONE, and BLACKBERRY, and an operating system running in the second system includes LINUX or an eCOS.

The embodiments shown in FIG. 7 and FIG. 8 and the method embodiments shown in FIG. 1 and FIG. 2 belong to a same idea, and also have same technical effects. For details, reference may be made to descriptions of the foregoing method embodiments, and details are not described herein again.

Figure 9:
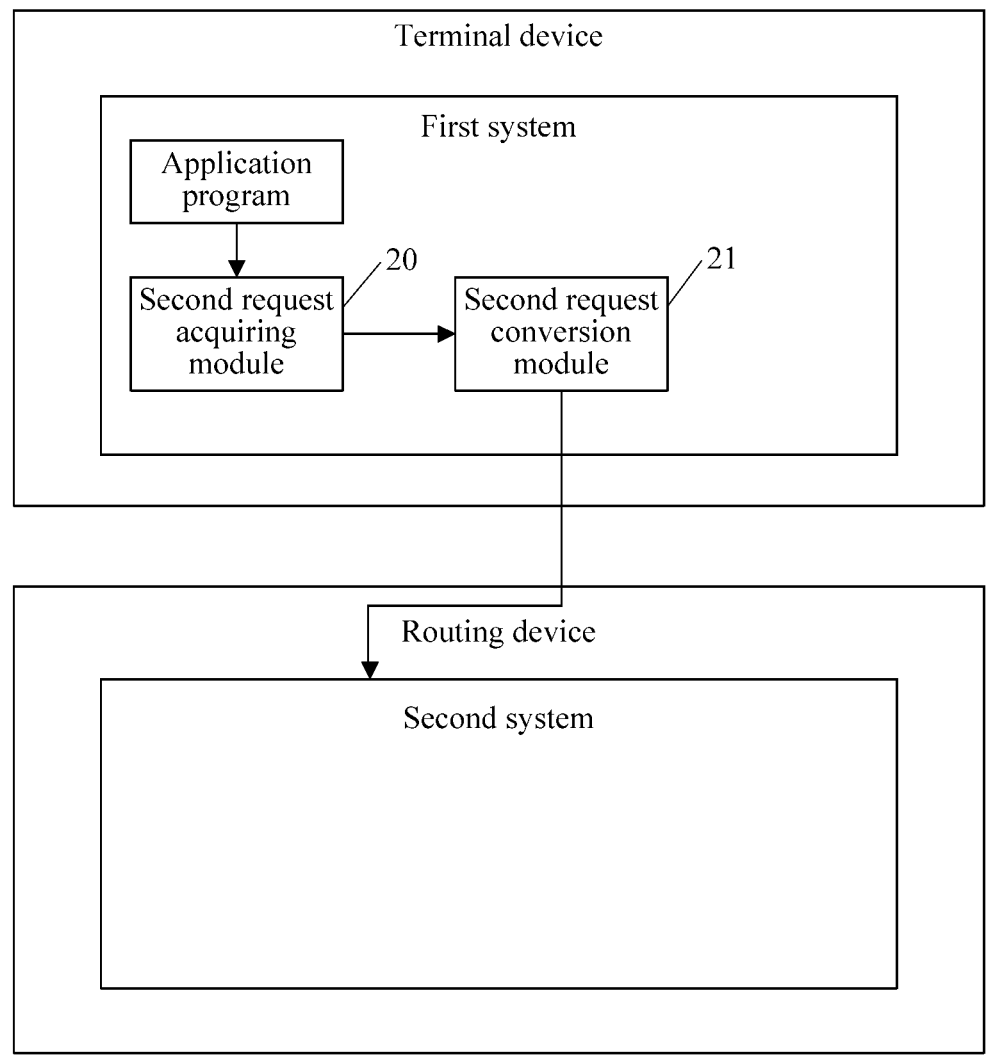
FIG. 9 is a schematic structural diagram of a terminal device according to a first embodiment of the present disclosure.

Reference may be made to FIG. 9, which is a schematic structural diagram of a terminal device according to a first embodiment of the present disclosure. In this embodiment of the present disclosure, the terminal device includes a first system, and the first system includes a second request acquiring module 20 and a second request conversion module 21.

The second request acquiring module 20 is configured to acquire a first API call request, where the first API call request is sent by an application program running in the first system.

Further, the terminal device includes the first system, and a routing device includes a second system. The application program runs in the first system of the terminal device. The second request acquiring module 20 acquires a first API call request sent by the application program when the application program needs to call an API provided by the second system of the routing device, where the first API call request is used to call a routing capability API provided by the second system of the routing device. The first API call request may include multiple request parameters, for example, the request parameters include an operation command, an API interface version number, an API type, an API call request format, and the like.

The second request conversion module 21 is configured to convert the first API call request into a second API call request that matches the second system included in the routing device, and send the second API call request to the routing device such that the routing device executes the second API call request.

Further, operating systems running in the first system of the terminal device and in the second system of the routing device are of different types, and API call syntax rules in different operating systems are also different. The second request conversion module 21 converts the first API call request into a second API call request recognizable to the operating system that runs in the second system included in the routing device, and sends the second API call request to the operating system that runs in the second system included in the routing device. After receiving the second API call request, the routing device executes an operation indicated by the second API call request, and generates a corresponding second API call response.

In implementation of this embodiment of the present disclosure, an API call request that is sent from an application program running in a first system is converted into a call request matching a second system, which implements a cross-platform API call for the application program in the first system. Because the first system is a universal development platform, on which it is less difficult to develop an application program, a developer does not need to develop an application program directly in a special second system of a routing device, which reduces difficulty in application program development.

Figure 10:
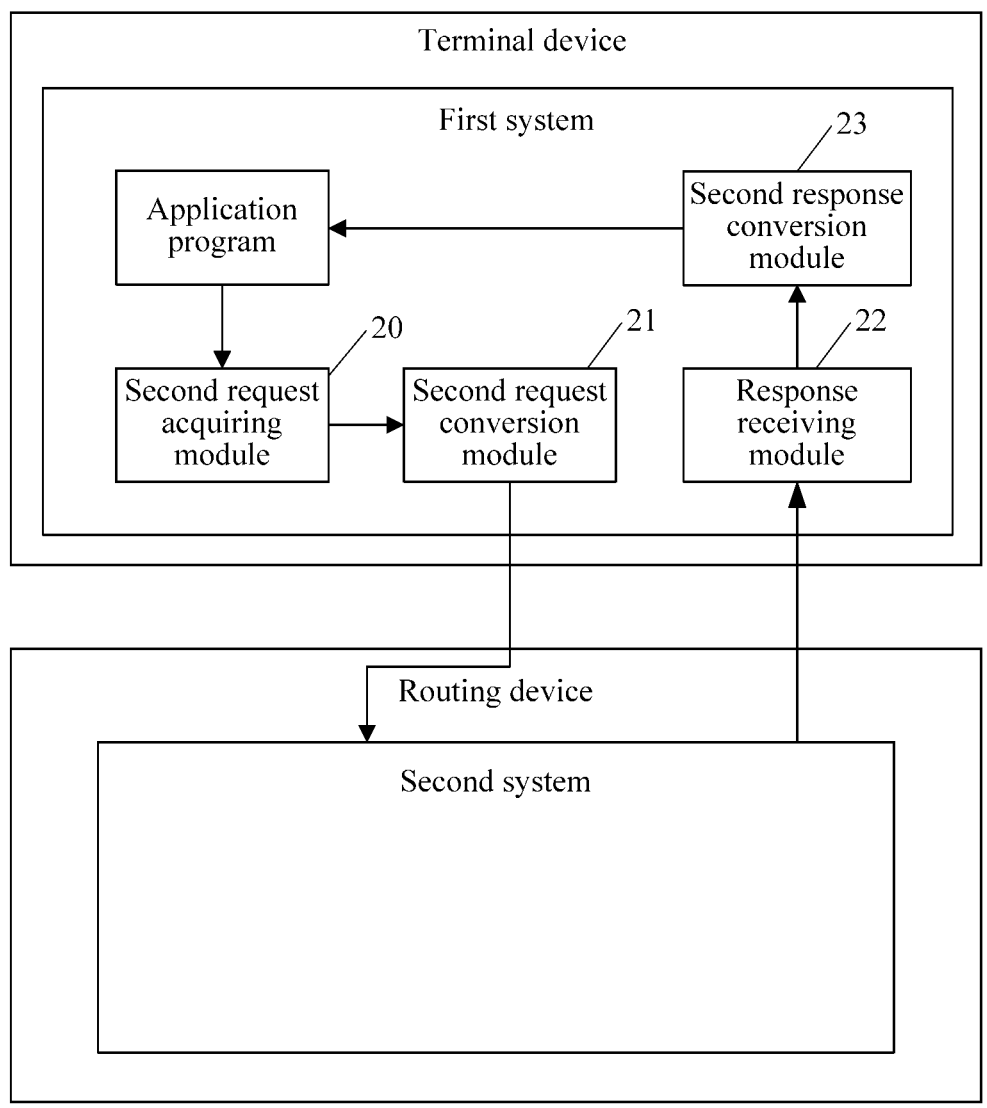
FIG. 10 is a schematic structural diagram of a terminal device according to a second embodiment of the present disclosure.

Reference may be made to FIG. 10, which is schematic structural diagram of a terminal device according to a second embodiment of the present disclosure. In this embodiment of the present disclosure, the terminal device not only includes a second request acquiring module 20 and a second request conversion module 21, but also includes a response receiving module 22 and a second response conversion module 23.

The response receiving module 22 is configured to receive a second API call response returned by the second system after the second request conversion module 21 sends the second API call request to the routing device.

The second response conversion module 23 is configured to convert the second API call response into a first API call response matching the first system, and return the first API call response to the application program.

Optionally, when converting the first API call request into the second API call request that matches the second system included in the routing device, the second request conversion module 21 is further configured to convert, according to a preset first mapping relationship, the first API call request into the second API call request matching the second system, or extract a request parameter from the first API call request, and generate, according to the request parameter, the second API call request matching the second system.

When converting the second API call response into the first API call response matching the first system, the second response conversion module 23 is further configured to convert, according to a preset second mapping relationship, the second API call response into the first API call response matching the first system, or extract a response parameter from the second API call response, and generate, according to the response parameter, the first API call response matching the first system.

The first API call request includes any one of an application authentication request, a tunnel status acquiring request, a tunnel status configuration request, a DNS information acquiring request, and a DNS information configuration request.

An operating system running in the first system includes any one of ANDROID, an iOS, WINDOWS PHONE, and BLACKBERRY, and an operating system running in the second system includes LINUX or an eCOS.

The embodiments shown in FIG. 9 and FIG. 10 and the method embodiments shown in FIG. 3 and FIG. 4 belong to a same idea, and also have same technical effects. For details, reference may be made to descriptions of the foregoing method embodiments, and details are not described herein again.

Figure 11:
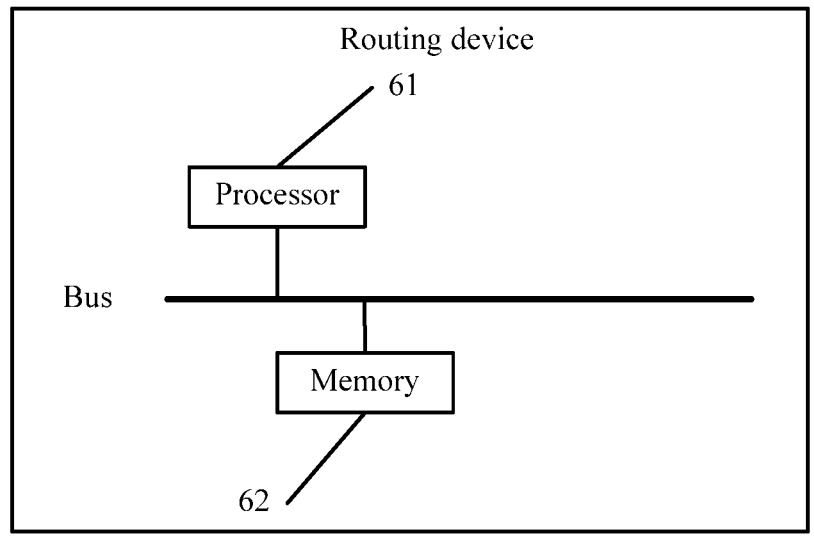
FIG. 11 is a schematic structural diagram of a routing device according to a third embodiment of the present disclosure.

Reference may be made to FIG. 11, which is a schematic structural diagram of a routing device according to a third embodiment of the present disclosure. In this embodiment of the present disclosure, the routing device includes a processor 61 and a memory 62, where there may be one or more processors 61 in the routing device, and one processor is used as an example in FIG. 11. In some embodiments of the present disclosure, the processor 61 and the memory 62 may be connected using a bus or in another manner, and a bus connection is used as an example in FIG. 11.

The memory 62 stores a group of program code, and the processor 61 is configured to call the program code stored in the memory 62 to execute the operations of acquiring a first API call request, where the first API call request is sent by an application program running in a first system, converting the first API call request into a second API call request matching a second system, and sending the second API call request to the second system, and executing the second API call request, where the first system and the second system run in the routing device.

In some embodiments of the present disclosure, after executing the second API call request, the processor 61 is further configured to execute the operations of returning a second API call response to the first system, and converting the second API call response into a first API call response matching the first system, and returning the first API call response to the application program.

In some embodiments of the present disclosure, executing, by the processor 61, the operation of converting the first API call request into a second API call request matching the second system includes converting, according to a preset first mapping relationship, the first API call request into the second API call request matching the second system, or extracting a request parameter from the first API call request, and generating, according to the request parameter, the second API call request matching the second system.

In some embodiments of the present disclosure, executing, by the processor 61, the operation of converting the second API call response into a first API call response matching the first system includes converting, according to a preset second mapping relationship, the second API call response into the first API call response matching the first system, or extracting a response parameter from the second API call response, and generating, according to the response parameter, the first API call response matching the first system.

In some embodiments of the present disclosure, the first API call request includes any one or more of an application authentication request, a tunnel status acquiring request, a tunnel configuration request, a DNS information acquiring request, and a DNS information configuration request.

In some embodiments of the present disclosure, an operating system running in the first system includes any one of ANDROID, an iOS, WINDOWS PHONE, and BLACKBERRY, and an operating system running in the second system includes LINUX or an eCOS.

In implementation of this embodiment of the present disclosure, an API call request that is sent from an application program running in a first operating system is converted into a call request matching a second operating system, and a call response returned by the second operating system is converted into a call response matching the first operating system, which implements a cross-platform API call for the application program such that the application program in the first operating system may use resources of the second operating system, which achieves desirable compatibility, and reduces difficulty in application program development.

The embodiment shown in FIG. 11 and the method embodiments shown in FIG. 1 and FIG. 2 belong to a same idea, and also have same technical effects. For details, reference may be made to descriptions of the foregoing method embodiments, and details are not described herein again.

Figure 12:
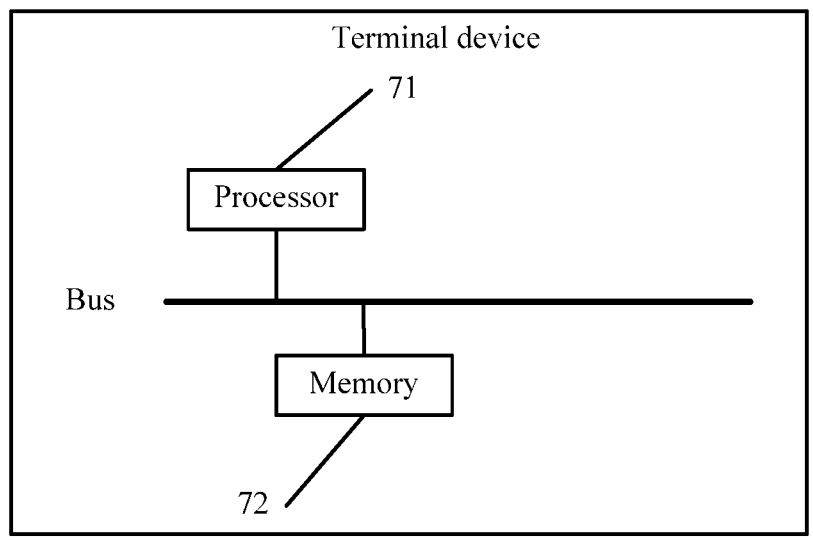
FIG. 12 is a schematic structural diagram of a terminal device according to a third embodiment of the present disclosure.

Reference may be made to FIG. 12, which is a schematic structural diagram of a terminal device according to a third embodiment of the present disclosure. In this embodiment of the present disclosure, the terminal device includes a processor 71 and a memory 72, where there may be one or more processors 71 in the terminal device, and one processor is used as an example in FIG. 12. In some embodiments of the present disclosure, the processor 71 and the memory 72 may be connected using a bus or in another manner, and a bus connection is used as an example in FIG. 12.

The memory 72 stores a group of program code, and the processor 71 is configured to call the program code stored in the memory 72 to execute the operations of acquiring a first API call request, where the first API call request is sent by an application program running in a first system, and the first system runs in the terminal device, and converting the first API call request into a second API call request matching a second system, and sending the second API call request to the routing device such that the routing device executes the second API call request.

In some embodiments of the present disclosure, after sending the second API call request to the routing device, the processor 71 is further configured to execute the operations of receiving a second API call response returned by the second system, and converting the second API call response into a first API call response matching the first system, and returning the first API call response to the application program.

In some embodiments of the present disclosure, executing, by the processor 71, the operation of converting the first API call request into a second API call request matching the second system includes converting, according to a preset first mapping relationship, the first API call request into the second API call request matching the second system, or extracting a request parameter from the first API call request, and generating, according to the request parameter, the second API call request matching the second system.

In some embodiments of the present disclosure, executing, by the processor 71, the operation of converting the second API call response into a first API call response matching the first system includes converting, according to a preset second mapping relationship, the second API call response into the first API call response matching the first system, or extracting a response parameter from the second API call response, and generating, according to the response parameter, the first API call response matching the first system.

In some embodiments of the present disclosure, the first API call request includes any one or more of an application authentication request, an IP address configuration request, an IP address acquiring request, an IP routing protocol configuration request, a port configuration request, a tunnel status acquiring request, a tunnel configuration request, a DNS information acquiring request, and a DNS information configuration request.

In some embodiments of the present disclosure, an operating system running in the first system includes any one of ANDROID, an iOS, WINDOWS PHONE, and BLACKBERRY, and an operating system running in the second system includes LINUX or an eCOS.

The embodiment shown in FIG. 12 and the method embodiments shown in FIG. 3 and FIG. 4 belong to a same idea, and also have same technical effects. For details, reference may be made to descriptions of the foregoing method embodiments, and details are not described herein again.

A person of ordinary skill in the art may understand that all or some of the processes of the methods in the embodiments may be implemented by a computer program instructing relevant hardware. The program may be stored in a computer readable storage medium. The processes of the methods in the embodiments are performed when the program runs. The foregoing storage medium may include a magnetic disk, an optical disc, a read-only memory (ROM), or a random access memory (RAM).

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. An operating method of a routing device, the routing device comprising a first system and a second system, and the method comprising:

acquiring, by the first system, a first application programming interface (API) call request, the first API call request received from an application program running in the first system;

converting, by the first system, the first API call request into a second API call request matching the second system;

sending the second API call request to the second system;

executing, by the second system, the second API call request;

discovering, by the first system, the second system using a universal plug and play (UPnP) protocol;

establishing, by the first system, a transmission control protocol (TCP) connection between the first system and the second system;

sending, by the first system, an application authentication request to the second system;

returning, by the second system, an application authentication response to the first system;

calling, by the application program, a first tunnel API of the first system to send an API call request to the first system;

sending, by the first system, a first point to point tunneling protocol (PPTP) tunnel status acquiring request to the second system, the first PPTP tunnel status acquiring request being converted from the API call request;

returning, by the second system, a response result carrying PPTP tunnel status information of the routing device to the first system;

sending, by the first system, the response result to the application program for presentation;

sending, by the first system, a PPTP tunnel configuration request to the second system;

calling, by the application program, a second tunnel API of the first system to configure a PPTP tunnel of the routing device;

sending, by the first system, a second PPTP tunnel status acquiring request to the second system; and calling, by the application program, the first tunnel API of the first system to check whether the PPTP tunnel of the routing device is successfully configured.

2. The method according to claim 1, wherein after executing the second API call request, the method further comprises:

returning, by the second system, a second API call response to the first system;

converting, by the first system, the second API call response into a first API call response matching the first system; and returning the first API call response to the application program.

3. The method according to claim 2, wherein converting the second API call response into the first API call response comprises converting, by the first system according to a preset second mapping relationship, the second API call response into the first API call response matching the first system.

4. The method according to claim 2, wherein converting the second API call response into the first API call response comprises:

extracting, by the first system, a response parameter from the second API call response; and generating, according to the response parameter, the first API call response matching the first system.

5. The method according to claim 1, wherein converting the first API call request into the second API call request comprises converting, by the first system according to a preset first mapping relationship, the first API call request into the second API call request matching the second system.

6. The method according to claim 1, wherein converting the first API call request into the second API call request comprises:
extracting, by the first system, a request parameter from the first API call request; and
generating, according to the request parameter, the second API call request matching the second system.

7. The method according to claim 1, wherein the first API call request comprises any one or more of an application authentication request, an Internet Protocol (IP) address configuration request, an IP address acquiring request, an IP routing protocol configuration request, a port configuration request, a tunnel status acquiring request, a tunnel configuration request, a domain name system (DNS) information acquiring request, and a DNS information configuration request.

8. The method according to claim 1, wherein an operating system running in the first system comprises any one of ANDROID operating system, an APPLE mobile device operating system iOS, WINDOWS PHONE operating system, and BLACKBERRY operating system, and wherein an operating system running in the second system comprises LINUX operating system.

9. The method according to claim 1, wherein an operating system running in the first system comprises any one of ANDROID operating system, an APPLE mobile device operating system iOS, WINDOWS PHONE operating system, and BLACKBERRY operating system, and wherein an operating system running in the second system comprises an embedded configurable operating system (eCOS).

10. A routing device, comprising:
a processor; and
a memory coupled to the processor and configured to store a group of program code, the processor being configured to call the group of program code stored in the memory to execute the following operations:
acquire a first application programming interface (API) call request, the first API call request received from an application program running in a first system;
convert the first API call request into a second API call request matching a second system;
send the second API call request to the second system;
execute the second API call request, wherein the first system and the second system run in the routing device; discover the second system using a universal plug and play (UPnP) protocol;
establish a transmission control protocol (TCP) connection between the first system and the second system;
send an application authentication request to the second system;
return an application authentication response to the first system;
call a first tunnel API of the first system to send an API call request to the first system;
send a first point to point tunneling protocol (PPTP) tunnel status acquiring request to the second system, the first PPTP tunnel status acquiring request being converted from the API call request;
return a response result carrying PPTP tunnel status information of the routing device to the first system;
send the response result to the application program for presentation;
send a PPTP tunnel configuration request to the second system;
call a second tunnel API of the first system to configure a PPTP tunnel of the routing device;
send a second PPTP tunnel status acquiring request to the second system; and
call the first tunnel API of the first system to check whether the PPTP tunnel of the routing device is successfully configured.

11. The routing device according to claim 10, wherein after executing the second API call request, the processor is further configured to:
return a second API call response to the first system;
convert the second API call response into a first API call response matching the first system; and
return the first API call response to the application program.

12. The routing device according to claim 11, wherein executing the operation of converting the second API call response into the first API call response comprises converting, according to a preset second mapping relationship, the second API call response into the first API call response matching the first system.

13. The routing device according to claim 11, wherein executing the operation of converting the second API call response into a first API call response comprises:
extracting a response parameter from the second API call response; and
generating, according to the response parameter, the first API call response matching the first system.

14. The routing device according to claim 10, wherein executing the operation of converting the first API call request into the second API call request comprises converting, according to a preset first mapping relationship, the first API call request into the second API call request matching the second system.

15. The routing device according to claim 10, wherein executing the operation of converting the first API call request into the second API call request comprises:
extracting a request parameter from the first API call request; and
generating, according to the request parameter, the second API call request matching the second system.

16. The routing device according to claim 10, wherein the first API call request comprises any one or more of an application authentication request, an Internet Protocol (IP) address configuration request, an IP address acquiring request, an IP routing protocol configuration request, a port configuration request, a tunnel status acquiring request, a tunnel configuration request, a domain name system (DNS) information acquiring request, and a DNS information configuration request.

17. The routing device according to claim 10, wherein an operating system running in the first system comprises any one of ANDROID operating system, an APPLE mobile device operating system iOS, WINDOWS PHONE operating system, and BLACKBERRY operating system, and wherein an operating system running in the second system comprises LINUX operating system.

18. The routing device according to claim 10, wherein an operating system running in the first system comprises any one of ANDROID operating system, an APPLE mobile device operating system iOS, WINDOWS PHONE operating system, and BLACKBERRY operating system, and wherein an operating system running in the second system comprises an embedded configurable operating system (eCOS).

* * * * *